May 28, 1935.   S. N. NORTH ET AL   2,002,865
MILK STRAINER
Original Filed May 27, 1932
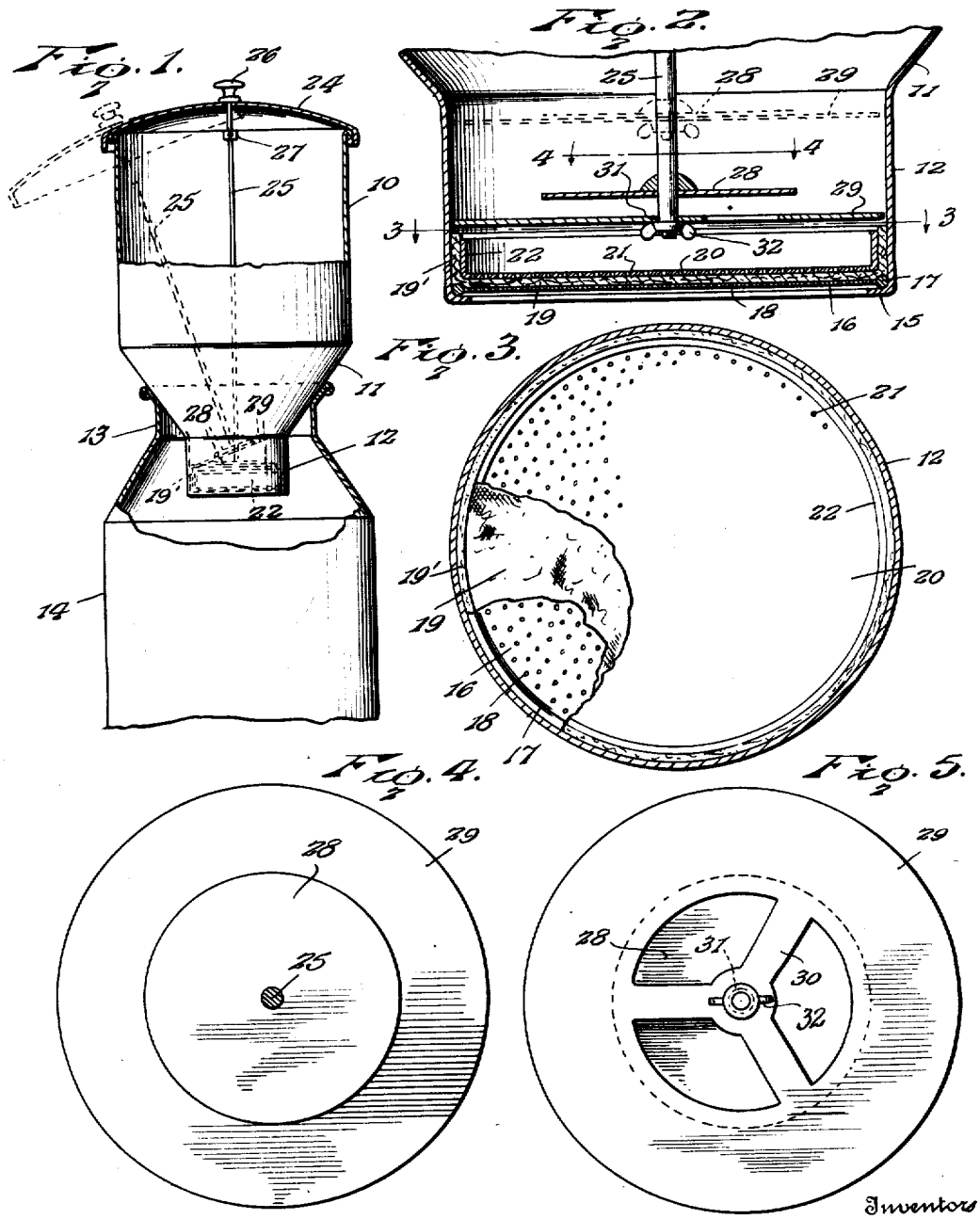
Inventors
T. J. Gurley.
S. N. North.
By
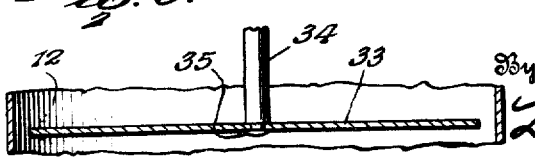
Attorneys Patented May 28, 1935

2,002,865

UNITED STATES PATENT OFFICE 2,002,865

MILK STRAINER

Samuel N. North, Rising Sun, and Thomas J. Gurley, Patriot, Ind.; said North assignor to Albert L. Lowe, Patriot, Ind.

Application May 27, 1932, Serial No. 613,958
Renewed April 14, 1934

4 Claims. (Cl. 210—158)

This invention relates to milk strainers and has for an object to provide a strainer that will prevent pollution of the milk while it is being poured into the strainer and thus eliminate one of the annoying sources of pollution.

A further object is to provide a milk strainer which will effectively remove the dust and other polluting substances which unavoidably get into the milk during the milking operation.

A further object is to provide a milk strainer in which the entire area of the strainer will be utilized during the straining operation to more effectively strain the milk than hitherto possible and at the same time eliminate one of the causes of poorly strained milk, that is, the occurrence of "wash outs" in the strainer pad.

A further object is to provide a milk strainer having incorporated therein a plunger which may be operated from time to time if necessary to dislodge globules of fat accumulating in the strainer perforations so that maximum efficiency of the strainer will exist at all times.

A further object is to provide a milk strainer embodying a cover which is but partly open at its limit of movement so that an opening remains only sufficiently large to admit the stream of milk being poured into the strainer and thus the usual large opening at the top of the strainer, which ordinarily admits dust and debris while the milk is being poured into the strainer, is eliminated.

A further object is to provide a baffle operatively connected to the cover to catch the force of the blow delivered by the milk during the pouring operation and dissipate the blow so that the strainer pad will not be subjected to this force and thus its long life and effective operation will be greatly promoted.

A further object is to provide a milk strainer which may be readily disassembled and thoroughly cleansed and may be easily reassembled in minimum time after cleansing.

With the above and other objects in view the invention consists in certain novel details of construction and combinations of parts hereinafter fully described and claimed it being understood that various modifications may be resorted to within the scope of the appended claims without departing from the spirit or sacrificing any of the advantages of the invention.

In the accompanying drawing forming part of this specification,

Figure 1 is a side elevation, partly in section, showing the strainer in operative position on a standard milk can, Figure 2 is an enlarged detail section showing the construction of the straining elements, plunger and baffle, Figure 3 is a cross section taken on the line 3—3 of Figure 2, showing the straining elements, Figure 4 is a cross section taken on the line 4—4 of Figure 2, Figure 5 is an underneath view of the plunger and baffle, and, Figure 6 is a detail section showing a modified form of plunger and baffle.

Referring now to the drawing in which like characters of reference designate similar parts in the various views, a container for the milk to be strained is shown comprising a cylindrical shell 10, the lower end of which is constricted to provide a funnel 11 which terminates in a cylindrical spout 12, the funnel and spout being of such dimensions as to readily enter the top 13 of a standard milk can 14 and support the shell superposed upon and in axial alignment with the milk can, as best shown in Figure 1.

By now referring to Figure 2 it will be seen that the bottom of the funnel spout is turned inwardly to provide an annular flange 15, the purpose of which is to support the straining elements. The straining elements preferably comprise a bottom disk 16 which is provided with a reinforcing ring 17 at the edge to rest upon the flange 15. Contrary to the usual construction, the disk is provided with minute perforations 18, best shown in Figure 3, which are arranged close together. This bottom disk forms an abutment or support for a strainer pad 19, the marginal edge of which is turned up vertically, and provides a flange 19' which intimately engages the wall of the spout 12. The strainer pad is of the usual standard type composed, for instance, of gauze such as cotton, or similar flimsy material. The remaining straining element consists of a disk 20, which like the bottom disk 16, is provided with a multitude of minute perforations 21, as best shown in Figure 3, arranged close together. The disk 20 is provided with an upturned flange 22 which bears against the flange 19' of the strainer pad 19 and clamps the same against the wall of the funnel while the disk itself clamps the strainer pad against the bottom disk 16. Pressure against the bottom disk pushes the strainer elements upward whereupon they may be lifted out of the shell for cleansing.

It will here be stated, that by virtue of the top disk 20 and bottom disk 16 being provided with extremely minute perforations arranged close together, that a source of the great difficulty of properly straining milk is overcome in that ordinarily where large perforations are used, it will be found in practice, that the strainer pad 19 becomes "washed out" at the areas exposed by the large openings and when this occurs proper straining is impossible. In the trade the term "washed out" means that cylindrical areas will occur in the pad which will be darker than surrounding areas due to the accumulation of polluting substances gathered by the strainer pad, and the structure of the strainer pad in such darkened areas becomes disrupted due to the frangible nature of the strainer pad, either from the force of the blow delivered by the velocity of the milk being poured into the straining container, or from other causes, as pressure of the milk, and consequently such broken clogged areas of the strainer are practically worthless to perform effective straining of the milk. Furthermore, where large openings are employed in the straining disks as usually is the case, it will be found, that great areas of the strainer pad between the openings are not darkened by material gathered by the strainer pad showing that such areas do not perform any straining function and are rendering the strainer pad only partly efficient. In contrast to this, by forming a great number of minute close assembled perforations in both disks 16 and 20, it is found in practice, that practically all of the area of the strainer pad is uniformly darkened showing that the maximum efficiency of the pad is utilized in performing the straining function, while at the same time the strainer pad, when used with such disks will be found to be absolutely devoid of "wash outs". This indicates that throughout the life of the pad the milk passing therethrough has been properly strained throughout the area of the pad and consequently the milk so strained will exhibit proportionately less polluting matter escaping through the pad than hitherto possible.

It is also to be noted that the rim of the upper strainer disk binds the marginal portion of the strainer cloth against the wall of the spout so that a seal is formed to prevent leakage of the milk around the strainer. If so desired, the rim may be beveled or outwardly inclined initially so as to more firmly effect a seal as it is inserted in the spout, and the upper disc may be inverted without losing any advantages of the seal.

Referring more particularly to Figures 1 and 2, it will be seen that a flanged cover 24 closes the open top of the shell 10. A rod 25 is slidably fitted at the top in a central opening in the cover and terminates in knob 26. A stop collar 27 is mounted on the rod below the cover. Near the lower end the rod is equipped with an inperforate disk 28 which is fixed to the rod in any preferred manner. Below the disk the rod is equipped with an annulus 29 having a spider 30 which is provided with a central opening 31, as best shown in Figure 5, to slidably receive the rod. The rod is preferably provided with a wing nut 32 to provide a stop which supports the annulus 29. The annulus 29 is of sufficient outer diameter to extend nearly to the wall of the spout 12.

It will be seen that when the knob 26 is pulled upwardly the rod 25 will be raised and carry with it the disk 28 and annulus 29. At its upper limit of movement, determined by engagement of the stop collar 27 with the cover 24, the rod may be shoved downwardly in the direction of the arrow heads in Figure 2, and assuming the shell is full of milk, the annulus 29 will be overtaken by the disk 28 due to the pressure of the milk against the annulus upwardly, and when this occurs, during further downward movement of the rod both the disk 28 and the annulus 29 will be moved downward as a unit by the rod and constitute a plunger which forces the milk ahead of it through the minute perforations in the upper and lower disks 16 and 20, respectively, of the straining elements. The purpose of this plunger is to purge the minute perforations of clogging globules of fat which, in practice, accumulate in the same and retard the straining operation. In practice, it has been found beneficial to agitate the plunger gently several times at intervals to maintain said minute perforations purged of these clogging fat globules so that the straining operation will be accomplished expeditiously.

By now referring to Figure 1 it will be seen that when it is desired to pour the milk to be strained into the shell 10 the knob 26 may be grasped and the cover slid laterally until the rod 25 engages the shell 10 in which partly open position of the cover a sufficient opening is left at the top of the shell to admit the stream of milk being poured thereinto, while at the same time the cover 24 is in position to seal the top of the shell beyond the milk stream and prevent dust and foreign substances entering the shell during the pouring operation.

When the cover is in the open position shown in Figure 1, it will be observed that the rod 25 has moved from the vertical to the oblique dotted line position and during such movement has carried with it the disk 28 and annulus 29 to the dotted line position shown. In this position the disk and annulus coact in forming a baffle which receives the force of the blow dealt by the gravitating milk stream and dissipates the shock of the blow before it reaches the strainer pad 19 so that the latter is not disrupted or damaged as is usually the case when milk is poured unobstructed into the strainer and impinges against the strainer pad through the usual large openings in the straining disks hitherto encountered in ordinary milk straining apparatus.

It will be observed by referring to Figure 2, that when the fixed disk 28 and movable annulus 29 are in the position shown in full lines, milk can escape freely around the edge of the disk 28 and through the spider 30 which is the normal condition during the straining operation. However, when these parts are in the dotted line position shown in this figure and are being moved downwardly by the rod 25 to act as a plunger, a substantially liquid tight joint will be formed by the closely fitting surfaces of the disk and the annulus to prevent retrograde movement of the milk through the plunger although sufficient milk can escape upwardly around the outer edge of the annulus to positively prevent the plunger acting with the force of a tightly fitting piston which might cause sufficient pressure on the milk ahead of the plunger to disrupt or "wash out" the strainer pad.

In Figure 6 is shown a modified form of plunger, and in this modified form a single disk 33, preferably flat throughout, is shown as being fixedly secured to the lower end of the operating rod 34 by means of a rivet head 35. The disk 33 in this instance performs the function of the plunger and baffle, above attributed to the fixed disk 28 and sliding annulus 29.

To disassemble the strainer it is simply necessary to remove the cover and combined baffle and plunger therefrom as a unit whereupon the strainer elements may be pushed up from below and lifted out of the shell.

From the above description it is thought that the construction and operation of the invention will be fully understood without further explanation.

What is claimed is:

1. In a milk strainer, a container for the milk to be strained, straining elements in said container, a cover for the container limited in movement to be set in partly open position, and a baffle carried by the cover movable to operative position when the cover is opened.

2. A milk strainer comprising a container for the milk to be strained, straining elements in the container, a cover for the container tiltable to partly open position, a rod carried by the cover, and a baffle carried by the rod above the straining elements.

3. A milk strainer comprising a container for the milk to be strained, straining elements in the container, a cover for the container tiltable to partly open position, a rod carried by the cover and slidably mounted thereon, a disk fixed on the rod, an annulus of less diameter than the diameter of the container slidably mounted on the rod below the disk, and a stop shoulder on the rod supporting the annulus at its lower limit of movement, reciprocal movement of the rod serving to move the annulus into contact with the disk to provide a plunger for forcing the milk ahead of it through the straining elements.

4. A milk strainer comprising a container for the milk to be strained having a restricted open lower end adapted to enter the mouth of a milk can and support the container in superposed position thereupon and in axial alignment therewith, a stainer pad forming a closure in the bottom of the container, means for securing the pad in operative position, a disk above the pad provided with a plurality of minute closely assembled perforations exposing the pad, a cover for the container slidable thereon to partly open position, and a combined plunger and baffle operatively connected to the cover and disposed above said disk.

SAMUEL N. NORTH. [L. S.]
THOMAS J. GURLEY. [L. S.]